United States Patent
Brodsky

(10) Patent No.: US 7,177,445 B2
(45) Date of Patent: Feb. 13, 2007

(54) DISCRIMINATING BETWEEN CHANGES IN LIGHTING AND MOVEMENT OF OBJECTS IN A SERIES OF IMAGES USING DIFFERENT METHODS DEPENDING ON OPTICALLY DETECTABLE SURFACE CHARACTERISTICS

(75) Inventor: Tomas Brodsky, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 632 days.

(21) Appl. No.: 10/123,330

(22) Filed: Apr. 16, 2002

(65) Prior Publication Data

US 2003/0194110 A1    Oct. 16, 2003

(51) Int. Cl.
*G06K 9/00*      (2006.01)
*G06K 9/36*      (2006.01)
*G06K 9/46*      (2006.01)
*H04N 7/18*      (2006.01)
*H04N 9/64*      (2006.01)

(52) U.S. Cl. .................. 382/103; 382/107; 382/108; 382/236; 348/154; 348/155; 348/699; 348/700

(58) Field of Classification Search ................ 382/103, 382/107, 130, 236; 348/154, 155, 699, 700
See application file for complete search history.

(56) References Cited

U.S. PATENT DOCUMENTS

| | | | |
|---|---|---|---|
| 5,274,715 A * | 12/1993 | Hsu ........................... 382/109 |
| 5,731,832 A * | 3/1998 | Ng ............................. 348/155 |
| 5,847,756 A * | 12/1998 | Iura et al. ................ 348/220.1 |
| 5,937,092 A * | 8/1999 | Wootton et al. ............ 382/192 |
| 6,031,934 A | 2/2000 | Ahmad et al. .............. 382/154 |
| 6,035,067 A * | 3/2000 | Ponticos ..................... 382/226 |
| 6,104,831 A * | 8/2000 | Ruland ....................... 382/173 |
| 6,118,886 A | 9/2000 | Baumgart et al. .......... 382/103 |
| 6,137,947 A * | 10/2000 | Ohta et al. .................... 386/68 |
| 6,233,283 B1 * | 5/2001 | Chiu et al. ............. 375/240.27 |
| 6,275,532 B1 * | 8/2001 | Hibi et al. ............. 375/240.17 |
| 6,400,830 B1 * | 6/2002 | Christian et al. ........... 382/103 |
| 6,711,279 B1 * | 3/2004 | Hamza et al. ............... 382/103 |
| 2002/0057349 A1* | 5/2002 | Yamaguchi et al. ........ 348/222 |
| 2003/0053660 A1* | 3/2003 | Heyden ...................... 382/103 |
| 2003/0053686 A1* | 3/2003 | Luo et al. ................... 382/165 |
| 2003/0095710 A1* | 5/2003 | Tessadro ..................... 382/199 |
| 2003/0108250 A1* | 6/2003 | Luo et al. ................... 382/263 |
| 2003/0156759 A1* | 8/2003 | Colmenarez et al. ....... 382/228 |

* cited by examiner

*Primary Examiner*—Bhavesh M. Mehta
*Assistant Examiner*—Anthony Mackowey
(74) *Attorney, Agent, or Firm*—Michael E. Belk

(57) ABSTRACT

In a motion detection system, filters are applied to a series of digital images in order to determine whether changes in the properties of pixels between the current image and a reference model are due to motion of objects or to changes in lighting. The filter may be based on scaled differences between a current image and a reference model. The type of surface may be determined based on optical properties of the surface and then only the best filter for that type of surface is applied. Alternately, multiple filters may all be applied and the results combined. The processing may be reduced using a background model to determine which pixels are in the background and which are in the foreground and then only applying the filter to the foreground pixels.

16 Claims, 2 Drawing Sheets

DISCRIMINATING BETWEEN CHANGES IN LIGHTING AND MOVEMENT OF OBJECTS IN A SERIES OF IMAGES USING DIFFERENT METHODS DEPENDING ON OPTICALLY DETECTABLE SURFACE CHARACTERISTICS

FIELD OF THE INVENTION

The present invention relates to the field of video motion detection and object tracking systems.

BACKGROUND

Video motion detectors have been proposed for detecting moving objects based on changes between subsequent images. More specifically typical proposed systems incorporate a background model and identify objects based on changes between a current image and the background model. However, in addition to true moving objects, many changes between subsequent images are caused by changes in lighting. These include, for example, turning lights on or off, passing clouds casting shadows, moving lights such as car headlights shining on objects or background, and the changing position of the sun. The appearance of background objects can change dramatically due to slight changes in orientation with respect to a source of light. For example slight rotations of leaves of plants with respect to a light source or slight movements of highly reflective surfaces such as waves on water. In addition, light changes may be due to automatic adjustments of a video camera such as adjustment of the iris or adjustment of the gain of the video signal.

Systems have been proposed that determine whether changes between images are caused by a change in lighting or the motion of objects based on normalized cross correlation NCC between the background model and the current image.

Those skilled in the art are directed to the following references:
1. A. Elgammal, D. Harwood, L. Davis, "Non-Parametric Model For Background Subtraction", Proc. ICCV '99 Framerate Workshop, 1999.
2. C. Stauffer, W. E. L Grimson, "Adaptive Background Mixture Models For Real-Time Tracking", Proc. IEEE conf. on Computer Vision and Pattern Recognition, 1999.
3. K. Dawson-Howe, "Active Surveillance Using Dynamic Background Subtraction", Technical report TCD-CS-96-06, Dept. of Computer Science, Trinity College, Dublin, Ireland, 1996.
4. D. Toth, T. Aach, V. Metzer, "Illumination-Invariant Change Detection", Proc. 4th IEEE Southwest Symposium on Image Analysis and Interpretation, 2000.
5. U.S. Pat. No. 6,031,934 to Ahmad et. al. "Computer Vision System For Subject Characterization" issued Feb. 29, 2000.

All the above references are hereby incorporated in whole by reference.

SUMMARY OF THE INVENTION

In the invention of applicants, different filters are applied to discriminate between changes in lighting and the movement of objects. Each filter is superior to the other filters for different respective types of surfaces. Preferably, one filter is better for optically uniform surfaces and another filter is better for textured surfaces. Thus the system of the invention can more accurately discriminate between changes in lighting and motion of objects having different optical surface characteristics.

In one aspect of the invention, the type of surface is first determined and then only the best filter for that type of surface is applied to determine whether a change is due to a change in lighting or the movement of an object. Preferably, the classification according to the type of surface depends on the optical properties of the surface. Since only the best filter operates, the resources required for the filtering are reduced. Where different filters share the same hardware the time required to perform the filtering is also reduced.

In another aspect of the invention, multiple different filters are applied and the results of the filtering are combined to determine whether a change is due to a change in lighting or the movement of an object. This is the preferred method when there is no reliable preprocess for determining which filter would produce the best results, that is, the best filter can only be determined after the different filters have been applied. Preferably, the filters are chosen so that if any filter indicates the change in a pixel may be due to a change in lighting then the result is an indication that the change in the pixel is due to a change in lighting. In this case, the classification step is skipped thus reducing resource requirements. Where there are sufficient resources to perform the filtering in parallel multiple filters can operate practically as fast as a single filter.

In a third aspect of the invention a scaled difference SDIFF filter is applied to determine whether a change is due to a change in lighting or the movement of an object. For uniform surfaces, the scaled difference filter is better than the commonly used normalized cross correlation NCC filter that has been previously proposed.

In a fourth aspect of the invention, in addition to the background model, commonly provided for discriminating between foreground objects that may move and background objects that are unlikely to move, a different reference model is provided for determining whether changes between images are due to changes in lighting or motion of objects. Using different models for determining background and discrimination (between changes in lighting and movement of objects) allows each model to be optimized for its particular use. The reference model can be much smaller than the background model, so that, it can be easily implemented, for example, in an inexpensive video camera. The models can operate independently in parallel using different hardware so that the speed of the video processing is increased. This is especially important where multiple cameras are being used, and as the available resolution of cameras improves.

BRIEF DESCRIPTION OF THE DRAWINGS

These and other objects and advantages of the present invention will become clear to those skilled in the art in view of the detailed description of the following drawings.

DETAILED DESCRIPTION OF THE INVENTION

The following detailed description presents several example embodiments of the invention in order to describe the best mode for carrying out the invention and to enable those skilled in the art to make and use the invention.

The same numbers have been used in different figures to indicate that components to which they refer in different figures may be similar so that previous descriptions of the components apply.

Figure 1:
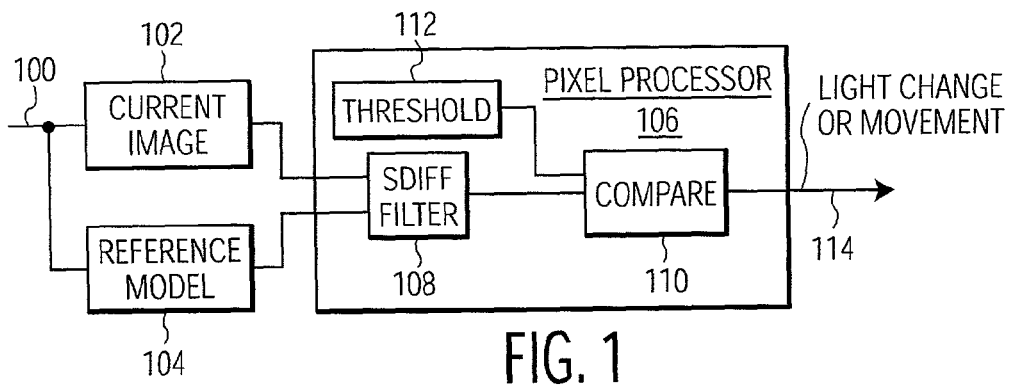
FIG. 1 shows a discriminator of the invention which uses the scaled difference to differentiate changes in lighting from movement of objects.

In FIG. 1, a sequence of digital video images $I_h$ of multiple pixels arrives at input 100. A current image X is selected and stored in memory 120 for processing. Preferably each subsequent image is processed so that the selected image is the last image that has arrived. The images also arrive at a reference model which is updated. The reference model unit 140 may provide a reference image R with the same number of pixels as the current image. Preferably the reference model is an exponentially decaying average of the previous images. For each image $I_h$ where b=1 to k images, a reference image $J_h$ is determined. The current image X is the last image that was received $I_k$. The current reference image R for use with the current image X being $J_{k-1}$, where $$J_h = \alpha * J_{h-1} + (1-\alpha)I_h|_{h=1}^k,$$

where $\alpha$ is a constant, $\alpha$ may be in a range from 0.4 to 0.98 and preferably $\alpha=0.9$ approximately.

For each pixel j, current image storage 120 and reference model unit 140 each output respective signals to the pixel processor 160 which determines whether the change in a property of the pixel is due to a change in lighting or to the movement of an object in the sequence of video images.

In the pixel processor 106, scaled difference filter 108 outputs a scaled difference for each pixel j of multiple pixels of the video image. The scaled difference depends on the value of properties of pixels in a region of pixels around pixel j in image I and the value of properties of pixels in a corresponding region of pixels around a corresponding pixel j in reference image R. The scaled difference also depends on an estimate of noise in image R in relation to previous images. More specifically, $$SDIFF_j \approx \frac{1}{M}\sum_{i=1}^{M}(x_i + (\bar{r}-\bar{x}) - r_i)^2/\sigma_i^2, \bar{x} = \frac{1}{N}\sum_{i=1}^{N}x_i, \bar{r} = \frac{1}{O}\sum_{i=1}^{O}r_i,$$

$x_i$ is the value of a property of pixel i of a region of pixels around pixel j in the current image X, $r_i$ is the value of the property of a corresponding pixel i around a corresponding pixel j in the reference image R, $\sigma_i$ is an estimate of noise which may be, for example, approximately the standard deviation of pixel i for multiple previous images. M, N, and O are the number of pixels in the areas used to determine $SDIFF_j$, $\bar{x}$ and $\bar{r}$ respectively, and preferably M, N and O all have the same value.

The regions of M, N, and O pixels may respectively form any geometrically compact areas such as a squares or rectangles with pixel j near the center of the area. For example, a square matrix of pixels with an odd number of columns and rows, such as a 3×3 matrix or a 5×5 matrix, so that with pixel j can be in the center position of the area. Preferably M, N and O are all the same number of pixels so the regions around pixel j for determining $SDIFF_j$, $\bar{x}$ and $\bar{r}$ are identical.

More preferably, $$SDIFF_j = \frac{1}{M}\sum_{i=1}^{M}|(x_i - \bar{x}) - (r_i - \bar{r})|/(\sigma_i + C),$$

where C is a small value that is sufficiently large to prevent instability when $\sigma_i$ is small. The absolute value is used to reduce the effects of noise.

A reasonably good estimate of standard deviation for the series of images is:

$$\sigma i = \frac{m_i}{0.68\sqrt{2}}, m_i = \text{MEDIAN}|x_{ih} - x_{ih-1}|_{h=2}^V,$$

where $x_{ih}$ is the value of the property of the ith pixel in image h and V is a selected number of previous images. The selection of V is a balance between minimizing storage requirements and providing sufficient reliability in discrimination between changes in lighting and movement of objects.

Comparator 110 compares the scaled difference produced by filter 108 with threshold 112 to determine whether the change in properties is due to a change in lighting or movement of an object. If the scaled difference is lower than the threshold then the change in properties of pixel j (changed from either previous images I or from reference image R or otherwise as described below) is due to changes in lighting. The threshold is selected to balance between the number of false negatives and the number of false positives depending on how the system is used. For example an unoccupied home alarm might may require practically zero false positives, while a manned security system, that simply displays video from cameras where motion is detected, may accept many false positives, but demand practically no false negatives. False positives are changes in the properties of a pixel that are caused by changes in lighting, but are falsely determined to indicate motion of objects. False negatives are changes in the properties of a pixel that are caused by motion of objects but are determined to indicate changes in lighting. Preferably, the threshold is set between 1 and 4 at approximately 2.5.

Comparator 108 outputs a signal 112 that includes indications of whether changes in the properties of each pixel j is due to a change in lighting or motion of an object. A more detailed description of the signal is provided below with reference to FIG. 6.

Figure 2:
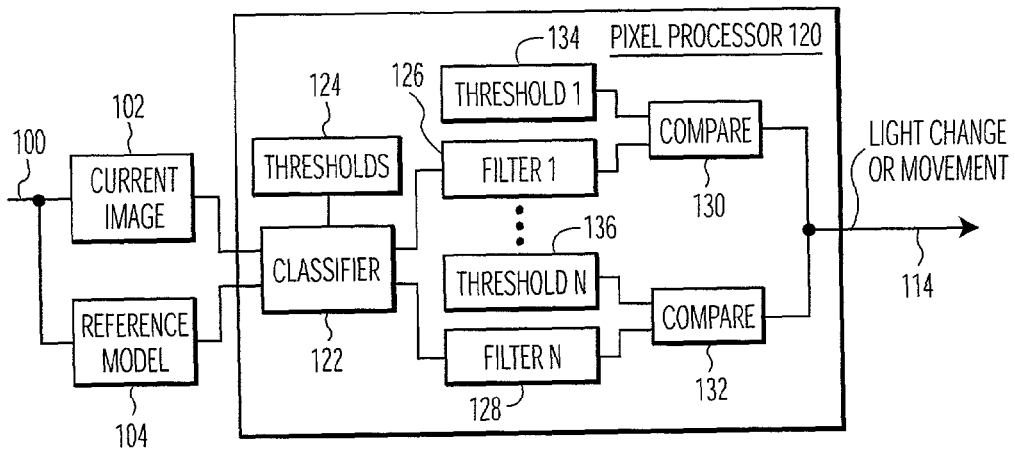
FIG. 2 shows a discriminator of the invention in which a classifier selects the best of multiple filters to differentiate changes in lighting from movement of objects.

FIG. 2, illustrates another embodiment of the discriminator of the invention. Input 100, current image storage 102 and reference model 104 may be as described above with reference to FIG. 1. Classifier 122 determines which filter to use to determine whether the change in the properties of each pixel j of multiple pixels of image X are due to change in lighting or motion of an object. The classifier may utilize one or more classifier functions and these classifier functions may depend on the properties of pixels of the current image and the reference image and the classifier may compare the value of the functions C to one or more thresholds 124 to choose the best filter. Preferably, for each of the multiple pixels of the current image X, a single classifier function determines which of two filters would be most reliable for determining whether changes in the properties of that pixel j indicate a change in lighting or movement of an object. In this example embodiment, the classifier may use a normalization function that is dependent on the properties of pixels in a region of pixels around the pixel j.

Preferably the normalization function NF is in the form of:

$$NF_j = \sqrt{\sum_{i=1}^{L}(x_i - \bar{x})^2} \times \sqrt{\sum_{i=1}^{M}(r_i - \bar{r})^2}, \bar{x} = \frac{1}{N}\sum_{i=1}^{N}x_i, \bar{r} = \frac{1}{O}\sum_{i=1}^{O}r_i,$$

where $x_i$ is the value of the property of the ith pixel in the relevant region of pixels of the current image X, and $r_i$ is the value of the property of the ith pixel in the relevant region of pixels of the reference image R. L, M, N and O are the number of pixels in regions of pixels around pixel j used for determining NF. They may be different than the values of M, N and O used to determine SDIFF above, but preferably they are all equal to the same value. The above discussion regarding the values of M, N, and O and the regions of pixels for SDIFF generally applies to the values of L, M, N, and O and the regions of pixels for determining NF.

The value of threshold 124 is selected depending on the use of the system and the environment it is used in. The value of threshold 124 depends on the number of possible values of the property of the pixel, the values selected for L and M and the noise in the pixel values (average value of a over the image). The threshold may be adjusted to maximize reliability in choosing between methods. The value of the threshold may be, for example, approximately from 250 to 1000.

Filters 126–128 are the best functions available for discriminating between changes of light and motion of objects for their respective types of surfaces as determined by classifier 122. Where the classifier uses the normalization function NF described above as a classifier function, then preferably there are two filters 126 and 128 and filter 126 uses the SDIFF function described above and filter 128 uses a normalized cross correlation NCC function. Normalized cross correlation is generally well known method, but the specifics of its implementation may vary.

The normalized cross correlation in this embodiment may be defined as follows:

$$NCC_j = \sum_{i=1}^{L}(x_i - \bar{x})\cdot(r_i - \bar{r}) / \sqrt{\sum_{i=1}^{L}(x_i - \bar{x})^2} \times \sqrt{\sum_{i=1}^{L}(r_i - \bar{r})^2}, \bar{x} = \frac{1}{O}\sum_{i=1}^{O}x_i, \bar{r} = \frac{1}{P}\sum_{i=1}^{P}r_i,$$

where $x_i$ is the value of the property of the ith pixel in a region of pixels of the current image X, and $r_i$ is the value of the property of the ith pixel in the relevant region of pixels of the reference image R. L, O and P are the number of pixels in regions of pixels around pixel j used for determining NCC. The value of O may be different than the value of O used to determine SDIFF above, but preferably they are all equal to the same value. The above discussion regarding the values of O and the regions of pixels for SDIFF generally applies to the values of L, O, and P and the regions of pixels for determining NCC.

The normalization function NF of the classifier, classifies surfaces into a relatively uniform type of surface or a relatively textured type of surface. The normalized cross correlation function is more reliable at discriminating between changes in lighting and movement of objects for textured surfaces, but is not as reliable for uniform surfaces. On the other hand, the scaled difference function is more reliable for discriminating between changes in lighting and movement of objects for uniform surfaces, but is not as reliable for textured surfaces. Thus, the two discrimination methods complement each other in the embodiment of the invention to allow superior discrimination between changes in lighting and movement of objects for a wide range of surfaces.

Each comparator 130 to 132 compares the results of the filter (e.g. the value of the filter fimetion) with a respective threshold. Only the filter that was selected by the classifier operates so that only one of the comparators operates. The threshold for each filter is selected to balance between false positives and false negatives depending on the use of the system. The discussion above regarding threshold 112 in FIG. 1 generally applies to these thresholds as well. Preferably, the value of threshold 134 is to same as threshold 12 in FIG. 1 since the respective filter 126 uses the same SDIFF function as used in filter 108 in FIG. 1. Preferably the value of threshold 136, for filter 128 that uses the NCC function as a filter, is between 0.25 and 0.75, and more preferably approximately 0.5. If the value of the function is more than the threshold it indicates that the change in the property of the pixel is due to a change in lighting.

The active comparator 130 to 132 outputs a signal that indicates whether the change in the property of pixel j was due to a change in lighting or the motion of an object.

Figure 3:
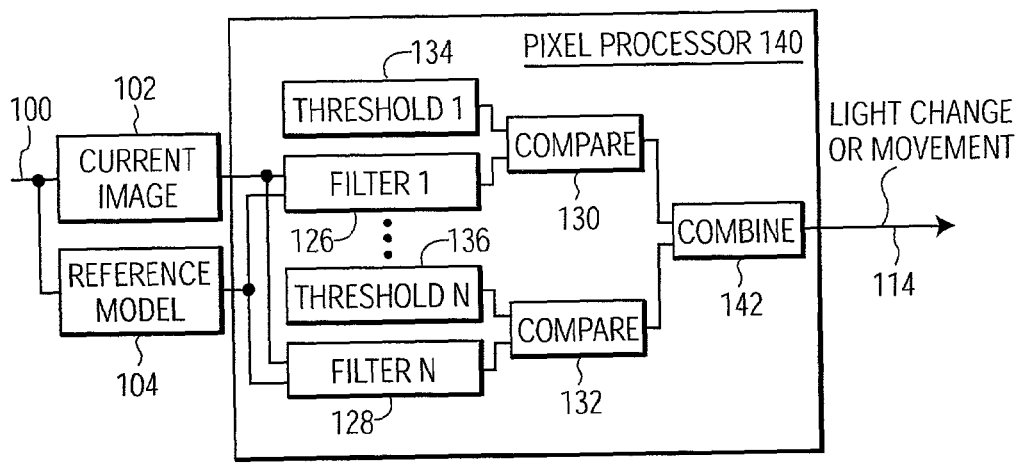
FIG. 3 shows a discriminator of the invention in which a combiner differentiates changes in lighting from movement of objects depending on multiple filters.

FIG. 3 illustrates still another embodiment of the pixel processor 140 of the present invention in which all of the filters 126–128 operate in parallel with the comparators 130–132 to determine respective indications of whether the change to pixel j is caused by a change in lighting or movement of an object. Combiner 142 determines whether the change to pixel j is caused by a change in lighting or movement of an object depending on the indications output from all the comparators. For example, where there are two filters, one filter is based on the NCC function and the other filter is based on the SDIFF function described above, then combiner 142 may be a simple OR gate that outputs a change in lighting indication if it receives a change in lighting indication from either comparator 130, 132. In this case the combiner outputs an indication of the movement of an object only when both comparators 130, 132 indicate that the change in the value of the property of pixel is due to the movement of an object.

Figure 4:
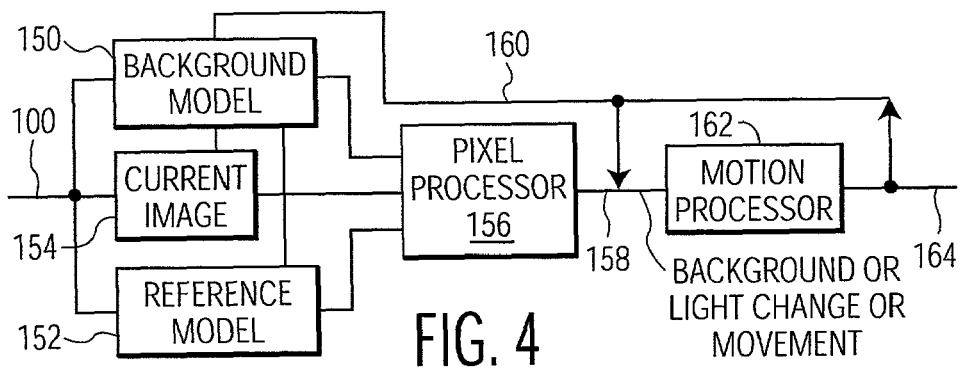
FIG. 4 shows a discriminator of the invention that uses both a background model and a reference model to differentiate changes in lighting from movement of objects.

FIG. 4 depicts an embodiment of the discriminator of the invention with background model 150 in addition to the reference model 152. The background model determines which parts of the image are background which are not expected to move, and which parts of the image are foreground objects that may be moving. Details of example background models are described in more detail below. In this example embodiment, background model 150 provides a signal to current image storage 154 and reference model 152 so that only pixels which are part of foreground are processed to determine whether changes to properties of the pixel indicate changes in light or movement of objects.

Pixel processor 156 may include portions of one or more of the pixel processors of FIGS. 1–3. For pixels that are part of the foreground pixel processor outputs a signal on output 158 indicating whether changes in the pixel are due to changes in lighting or motion of objects. In addition, the background model may output a signal through line 160 to output 158 indicating which pixels are in the background. Thus the output signal at 158 can be used to determine which pixels are in the background and which pixels are in the foreground and in addition which foreground pixels may have changed due to changes in lighting and which foreground pixels may have changed due to motion of objects.

The background model may communicate with pixel processor instead of or in addition to communicating with the current image memory and reference model so that the pixel processor only determines between light changes and movement for foreground pixels. When the pixel processor communicates with the background model it may output the indication of which pixels are background or the background model may continue to communicate with the output at 158 to provide the indication of which pixels are in the background.

Motion processor 162 clusters the foreground pixels that may have been due to motion to more robustly identify moving objects. This further processing may determine that some of the pixels for which the pixel processor indicated that changes in the pixel properties are likely due to changes in lighting are more likely portions of moving objects and vice versa that some of the pixels for which the pixel processor indicated that changes in properties were likely due to movement of objects were more likely changed due to changes in lighting.

The background model may be updated based only on the input images, but preferably the updating of the background model depends on the indication of which pixels may be changed due to lighting changes and which pixels may be changed due to motion of objects. More preferably, the background model also depends on the results of motion processor 162 which clusters the pixels with changes in properties indicating motion of objects.

For example, the background model $M_h$ may be a non-parametric statistical model containing samples vi from N previous images where i=1 to N, for each of multiple pixels. In which case the background pixels are determined for multiple pixels of current image X dependent on whether the probability $P_r$ that each pixel j is in the background exceeds a threshold. The probability that pixel j is a background pixel may be expressed as:

$$P_{rj} = \frac{1}{N} \sum_{i=1}^{N} K(x_j - v_{ji}),$$

where K is a Gaussian kernel with zero mean, $x_j$ is value of the property of pixel j in the current image, $v_{ji}$ is the value of the property of the ith sample of N samples in the background model for pixel j. The Gaussian kernel may be in the following form, for example:

$$K(x_j - v_{ji}) = \frac{1}{\sqrt{2\pi}\sigma_j} e^{-(x_j - v_{ji})^2 / 2\sigma_j^2},$$

where $\sigma_j$ is the standard deviation from image to image of pixel j. Preferably an estimate of $\sigma_j$ is used and is determined as follows:

$$\sigma_j \approx \frac{m_j}{0.68\sqrt{2}}, \, m_j = \text{MEDIAN}|v_{ji} - v_{ji-1}|_{i=2}^{M},$$

where $v_{ji}$ is the value of a property of pixel j in the ith image of M previous images.

The updating of reference model 152 of FIG. 4 depends on background model 150. The reference model communicates with the background model to determine which portions are in the foreground and which are in the background. Only the portions of the reference image that are in the background are updated. Otherwise, the updating of the background portions of the reference model is similar to the updating of reference model 104 of FIG. 1 as discussed above. Thus, the properties of the pixels in the background in the reference image of reference model 152 are updated, but the properties of pixels in the foreground in the reference image of reference model 152 continue to have the same property values until the background model determines that they are no longer in the foreground.

The classifiers of the FIGS. 1–4 may be combined for example with a classifier for some filters and a combiner for other filters and a background model connected to the reference model.

Figure 5:
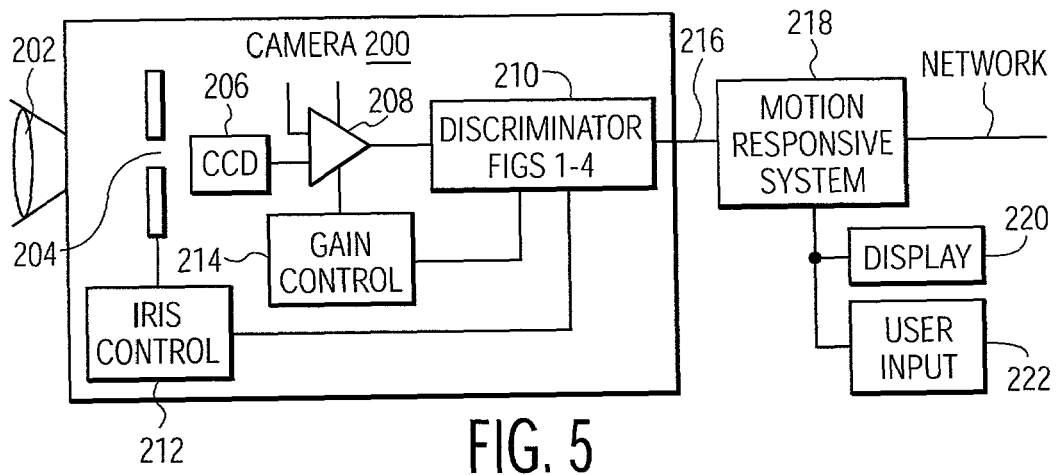
FIG. 5 illustrates a camera of the invention which contains the discriminator of one of FIGS. 1–4.

FIG. 5 illustrates a digital video camera 200 of the invention. Light is received through the lens 202 which focuses the light through iris opening 204 onto imaging unit 206 (such as a CCD or CMOS imager). The imaging unit provides a digital video signal through amplifier 208 to discriminator 210. The discriminator may be any of the discriminators of FIGS. 1–4 or a combination of those discriminators. An iris control 212 controls the opening 204 through the iris to control how much light reaches the IMAGING unit, and a gain control 214 controls the amplification of the signal that reaches discriminator 210. The output signal 216 from discriminator 210 is received by a motion responsive system 218 connected to display 220 and user input 222.

The motion responsive system 218 may be for example, a user identification system for identifying the user of the user interface for loading the user specific preferences or interface information. System 218 may be a home security system which provides an alarm when an intruder is detected. System 218 may be a commercial security system with multiple cameras that displays video from selected cameras to security personnel depending on motion detection.

Figure 6:
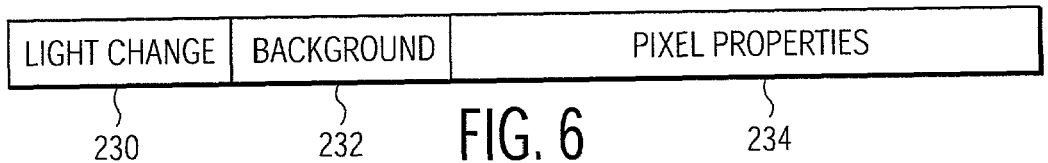
FIG. 6 illustrates a portion of a video stream of the invention such as the output signal of the camera of FIG. 5 containing light change data combined with image data.

FIG. 6 shows a portion of a digital image signal for a pixel with a portion reserved for identifying whether changes in the properties of the pixel are cause by changes in lighting or movement of objects. The signal may also have portions reserved for indicating whether the pixel is in the background or foreground. The signal may be for example, the signal at 114 in FIGS. 1–3 or the signal at either 158 or 164 in FIG. 4, or either the signal at 216 or 218 in FIG. 5. In the specific example of the signal shown in FIG. 6, portion 230 is a bit for indicating whether changes in the properties of the pixel are due to changes in lighting or motion of objects. In addition, portion 232 is a bit that may be provided for indicating whether the pixel is in the background or foreground. If the pixel is in the background, then there may have been no determination of whether the changes are due to light changes or motion in which case pixel 230 may be a random or dummy value. Portion 234 contains the properties of the pixel or the changes in the properties of the pixel. Many alternative arrangements for including the information are possible, for example, in an MPEG II signal; the light change indication bits 230 for several pixels may be included in a private stream.

Figure 7:
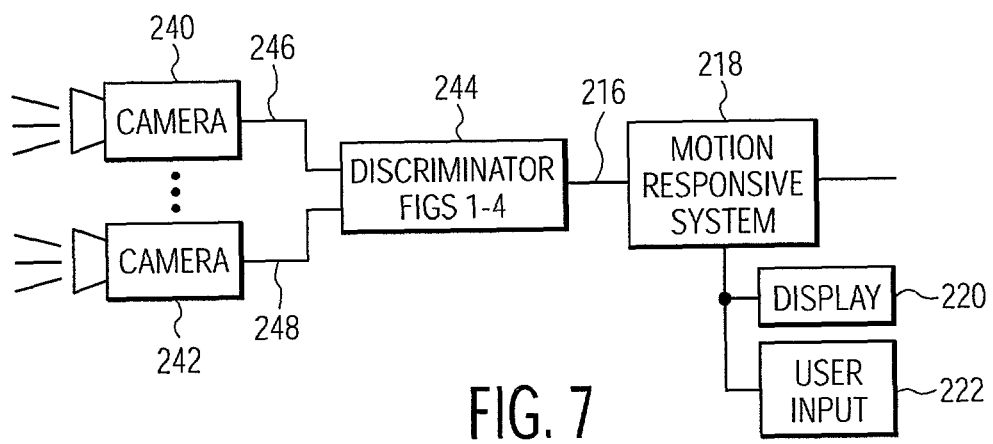
FIG. 7 illustrates a motion detection system of the invention in which a discriminator receives input from multiple cameras.

FIG. 7 illustrates another embodiment of the invention in which multiple video cameras 240 through 242 are connected to the same discriminator 244. For example, the discriminator may contain an instance of the apparatus described in relation to FIG. 4, for each camera. That is a background model, current image storage, reference model, pixel processor, and motion detector for each camera. In this embodiment, the signal at 246 through 248 would not contain the bits described in relation to FIG. 6 for indicating whether the change in pixel properties are due to a change in lighting or motion of an object. However, the signal at 216 would contain the bits indicating whether the change in pixel properties are due to a change in lighting or motion of an object.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A method comprising the steps of:
from a series of multiple images of multiple pixels, selecting a current image X;
determining a reference image R of multiple pixels;
for each pixel j of multiple pixels of the current image X, determining a scaled difference $SDIFF_j$, where $$K(x_j - v_{ji}) = \frac{1}{\sqrt{2\pi}\,\sigma_j} e^{-(x_j - v_{ji})^2/2\sigma_j^2},$$

$X_i$ is value of a property of pixel i of a region of M pixels around pixel j in the current image X, $r_i$ is the value of the property of a corresponding pixel i around a corresponding pixel j in the reference image R, $D_i$ is a noise factor depending on the sum of multiple differences between the value of die property of pixel i in different images or the reference image;
determining whether a change in pixel j is due to a change in lighting or the movement of an object in the image depending on the value of $SDIFF_j$.

2. The method of claim 1 wherein:
the reference image is an exponentially decayed average of previous images;
M, N and O are all equal, and M, N and O are either 9 or 25, and the regions of pixels are square regions that are symmetrically centered about pixel j in current image X and a corresponding pixel j in reference image R;

$$SDIFF_j = \frac{1}{M}\sum_{i=1}^{M} |(x_i - \bar{x}) - (r_i - \bar{r})|/(\sigma_i + C),$$

the use of absolute values improving robustness to noise, where $\sigma_i$ is an estimate of the standard deviation between images in the value of the property of pixel i, C is a small value that is sufficiently large to prevent instability when $\sigma_i$ is approximately 0;

$$\sigma i \approx \frac{m_i}{0.68\sqrt{2}},\; m_i = \mathrm{MEDIAN}|x_{ih} - x_{ih} - 1|_{h=2}^{P},$$

for P images of the multiple images;
the method further comprises a steps of: determining a background model and determining for each pixel j of multiple pixels whether the pixel is in to foreground or the background according to the background model, and the scaled difference $SDIFF_j$ is only determined for pixels of the multiple pixels that are in the foreground,
the method further comprises a step of determining for each pixel j of multiple pixels whether the region of pixels around pixel j is relatively uniform or relatively textured and the scaled difference $SDIFF_j$ is only determined for the pixel j if the region of pixels is relatively uniform;
the method further comprises the step of determining whether a change in pixel j is due to a change in lighting or the movement of an object in the image depending on the value of $SDIFF_j$ if the region is relatively uniform;
the method further comprises when the pixels around pixel j are not relatively uniform, the step of applying a different function to determine whether the change in the property of the pixel j is due to changes in light or motion of an object;
each pixel j of the multiple pixels has multiple properties;
when $SDIFF_j$ is determined for multiple properties of the same pixel j then $SDIFF_j$ is determined simultaneously for all the properties using the matrix form of the $SDIFF_j$ function, where $$\sigma_j \approx \frac{m_j}{0.68\sqrt{2}},\; m_i = \mathrm{MEDIAN}|x_{ih} - x_{ih} - 1|_{h=2}^{N},$$

I is the unit matrix, $\Sigma_i$ is the covariance matrix for all the properties.

3. The method of claim 2, wherein:
the matrix form of the SDIFF$_j$ function, is modified as follows $$J_h = \alpha * J_{h-1} + (1-\alpha)I_h|_{h=2}^{k}$$

in order to improve robustness from noise.

4. The method of claim 1 wherein;
the reference image is an exponentially decayed average of previous images.

5. The method of claim 1 wherein:
M, N and O are all equal, and M, N and O are either 9 or 25, and the regions of pixels are square regions that are symmetrically centered about pixel j in current image X and a corresponding pixel j in reference image R.

6. The method of claim 1 wherein:

$$SDIFF_j = \sum_{i=1}^{M} \sqrt{\vec{D}_i^T \vec{D}_i / (\Sigma_i + C \cdot I)}$$

the use of absolute values improving robustness to noise, where $\sigma_i$ is an estimate of the standard deviation between images in the value of the property of pixel i, C is a small value that is sufficiently large to prevent instability when $\sigma_i$ is approximately 0.

7. The method of claim 6 wherein:

$$J_h = \alpha * J_{h-1} + (1-\alpha)I_h|_{h=2}^{k}$$

for P images of the multiple images.

8. The method of claim 1 further comprising determining a background model and determining for each pixel j of multiple pixels whether the pixel is in the foreground or the background according to the background model, and the scaled difference SDIFF$_j$ is only determined for pixels of the multiple pixels that are in the foreground.

9. The method of claim 1 further comprising determining for each pixel j of multiple pixels whether the region of pixels around pixel j is relatively uniform or relatively textured and the scaled difference SDIFF$_j$ is only determined for the pixel j if the region of pixels is relatively uniform.

10. The method of claim 1 further comprising determining whether a change in pixel j is due to a change in lighting or the movement of an object in the image depending on the value of SDIFF$_j$ if the region is relatively uniform.

11. The method of claim 1 wherein further comprising, when the pixels around pixel j are not relatively uniform, applying a different function to determine whether the change in the property of the pixel j is due to changes in light or motion of an object.

12. The method of claim 1 wherein each pixel j of the multiple pixels has multiple properties.

13. The method of claim 1 wherein:
each pixel j of the multiple pixels has multiple properties;
when SDIFF$_j$ is determined for multiple properties of the same pixel j then SDIFF$_j$ is determined simultaneously for all the properties using the matrix form of the SDIFF$_j$ function, where $$NF_j \sqrt{\sum_{i=1}^{L}(x_i - \bar{x})^2} \times \sqrt{\sum_{i=1}^{M}(r_i - \bar{r})^2}, \bar{x} = \frac{1}{N}\sum_{i=1}^{N}x_i, \bar{r} = \frac{1}{O}\sum_{i=1}^{O}r_i,$$

I is the unit matrix, $\Sigma_i$ is the covariance matrix for all the properties.

14. A video camera, comprising:
an imager for converting light into digital images
an iris for regulating the quantity of light that reaches the imager;
an iris control that automatically controls the iris opening depending on the average illumination of at least a portion of the imager;
an amplifier for amplifying the electronic signal from the imager;
a gain controller for controlling the gain of the amplifier;
a discriminator that indicates which pixels may have changed due to change in lighting based on the method of claim 1.

15. A motion detector that detects movement of an object using the scaled difference SDIFF$_j$ of the method of claim 1.

16. A security system that detects movement of an object using the scaled difference SDIFF$_j$ of the method of claim 1.

* * * * *